Patented Nov. 2, 1937

2,097,743

UNITED STATES PATENT OFFICE 2,097,743

METHOD FOR THE RECOVERY OF TERPENES FROM MIXTURES CONTAINING THE SAME

Donald H. Sheffield, Brunswick, Ga., assignor to Hercules Powder Company, Wilmington, Del., a corporation of Delaware No Drawing. Application November 15, 1934, Serial No. 753,130

14 Claims. (Cl. 260—167)

This invention relates to methods for the recovery of terpenes from mixtures containing the same, and more particularly to methods for obtaining valuable terpene products from non-fractionable mixtures containing a pinene, as, for example, alpha-pinene, beta-pinene, etc.

In various stages of procedure for the production of turpentine and pine oil by the so-called steam and solvent process, fractions or cuts are obtained, which, although they may contain relatively large quantities of valuable terpenes, are commercially worthless because the presence of undesired constituents renders them unsalable. The various constituents of these cuts, valuable and undesirable, have boiling points and solubilities that render their separation by fractional distillation impossible as a practical matter.

Thus, for example, the usual steam and solvent process involves the steam distillation of chipped pine wood for the removal of most of the turpentine and pine oil, followed by the extraction of the steamed chips with, for example, a petroleum fraction similar to gasoline and having a boiling range of 120–160° C. This removes the residual turpentine and pine oil and also rosin. The mixture of turpentine and pine oil obtained by the steam distillation is fractionated into a plurality of cuts. The lowest boiling cut is largely alpha-pinene and is sold as wood turpentine. The next cut is usually termed the para-menthane cut, and contains a rather large quantity of this material, which is objectionable in turpentine. This cut also contains considerable quantities of alpha-pinene and dipentene, as well as some beta-pinene, all of which are valuable and readily salable products. While a refractionation of the para-menthane cut will yield a certain amount of dipentene, some of the dipentene and nearly all of the pinenes cannot be separated from the para-menthane. Hence the remainder of this cut, after separation of some dipentene, is commercially worthless despite its content of valuable terpenes.

Also, when the gasoline solution of turpentine, pine oil and rosin, obtained by extraction of the steamed pine chips, is subjected to fractionation, a plurality of cuts are obtained. These cuts comprise gasoline, a gasoline-terpene mixture, and pine oil, rosin being left as a residue. The gasoline-terpene mixture contains valuable terpenes, chiefly alpha-pinene, together with some dipentene and beta-pinene, but these terpenes cannot be recovered by fractional distillation and the presence of gasoline renders the cut as a whole worthless. This entire cut is accordingly commercially valueless.

In accordance with this invention I may recover valuable terpenes from such commercially valueless cuts or from any other mixture containing alpha- or beta-pinene from which these terpenes cannot be separated by fractionation. The method in accordance with this invention comprises the isomerization of the pinenes contained in such mixtures to terpenes having boiling points sufficiently different from those of the undesirable constituents of the mixture to make their separation by fractional distillation feasible. In particular the method in accordance with this invention comprises the isomerization of the pinenes present in such mixtures to dipentene and terpinolene and the separation of the latter from the mixture by fractional distillation.

The isomerization of alpha- or beta-pinene to dipentene and terpinolene in accordance with this invention may be accomplished, for example, by treating the mixture containing the pinene with a mineral acid or other relatively strong acid, such as, for example, nitric acid, sulfuric acid, hydriodic acid, phosphoric acid, acetic acid, formic acid, etc. or mixtures thereof. Preferably phosphoric, acetic, formic acids or mixtures thereof will be utilized since I have found that they are superior to other isomerizing agents. The use of these preferred acids for the isomerization of pinene is specifically claimed in my copending application, Serial No. 753,131 filed November 15, 1934. By the action of these agents the pinenes are isomerized into both dipentene and terpinolene, dipentene however being formed in predominant amount. These isomerization agents are without effect on the other constituents of the pinene-containing mixtures, and the product produced by their action is accordingly a mixture similar to that existing prior to the treatment but containing dipentene and terpinolene, the boiling points of which are about 20° C. higher than that of pinene, instead of pinene. From this resultant mixture the dipentene and terpinolene may easily be separated by fractional distillation.

Desirably the isomerization of the pinenes will be effected by employing acid in the amount of from about 5 to 15% of the weight of pinene present in the mixture. The acid preferably will be fairly concentrated, for example, in the case of nitric about 25%, sulfuric about 30%, hydriodic about 20%, phosphoric 65–75%, acetic 95%, formic 90–95%. The treatment may, if desired, be carried out at an elevated temperature, for example, from about 70 to about 100° C. Superatmospheric pressure may be employed, and desirably will be employed when formic acid is used. Desirably the mixture will be thoroughly agitated during the treatment to secure efficient contact of the two phases. The duration of the treatment will depend upon the particular agent used, the amount thereof, and the temperature employed. It will usually vary from 2 to 5 hours. Following the treatment, the acid employed may be substantially completely separated from the mixture and recovered for reuse. The terpene mixture will then be fractionated, after neutralization, if desired, for the separation and recovery of the dipentene and terpinoline produced.

The following examples are illustrative of practical procedure in accordance with this invention.

2000 cc. of the residual para-menthane cut after redistillation, described above, was heated for three hours at 70–85° C. with 20 g. 75% phosphoric acid and 100 g. 90% formic acid, the mixture being vigorously agitated. The acid mixture was then separated, and the terpene mixture washed with sodium hydroxide solution. The original residual para-menthane cut had approximately the following composition:

| | Percent |
|---|---|
| Alpha-pinene | 50 |
| Para-menthane | 20 |
| Unidentified terpenes | 30 |

The terpene mixture, after treatment as above, was fractionated into the following cuts:

| | Cubic centimeters |
|---|---|
| Para-menthane cut (40% para-menthane) | 1000 |
| Dipentene | 900 |
| Terpinene } Terpinolene } | 100 |

This represents a recovery of 1000 cc, or 50%, of commercially salable terpenes from the worthless original para-menthane cut.

2000 cc. of a gasoline-terpene mixture produced by fractionation of the gasoline extract from steamed pine wood, described above, was heated for five hours at 70–80° C. with 325 g. 70% phosphoric acid, the mixture being vigorously agitated. The acid mixture was separated and recovered, 99.2% of the acid used being recovered, and the gasoline-terpene mixture washed with sodium hydroxide solution. Upon fractionation of this mixture there was obtained:

| | Percent |
|---|---|
| Gasoline | 30 |
| Gasoline-terpene mixture | 20 |
| Dipentene | 33 |
| Terpinolene | 17 |

Since the original gasoline-terpene mixture had approximately the following composition:

| | Percent |
|---|---|
| Alpha-pinene | 50 |
| Gasoline | 40–45 |
| Dipentene | 5–10 | it will be seen that about 80% of the original mixture has been recovered in valuable form, 30% of gasoline for reuse in the extraction process, and 50% commercially salable terpenes.

It will be understood that the details and examples hereinabove set forth are illustrative only, and that the invention as broadly described and claimed herein is in no way limited thereby.

What I claim and desire to protect by Letters Patent is:

1. The method for the recovery of terpenes from a non-fractionable mixture containing a pinene which includes treating the mixture to isomerize the pinene to a terpene having a boiling point different from that of pinene, subjecting the treated mixture to fractional distillation and recovering the said terpene.

2. The method for the recovery of terpenes from a non-fractionable mixture containing a pinene which includes treating the mixture to isomerize the pinene to a terpene having a boiling point higher than that of pinene, subjecting the treated mixture to fractional distillation and recovering the said terpene.

3. The method for the recovery of terpenes from a non-fractionable mixture containing a pinene which includes treating the mixture to isomerize the pinene to dipentene, subjecting the treated mixture to fractional distillation and recovering the dipentene.

4. The method for the recovery of terpenes from a non-fractionable mixture containing a pinene which includes treating the mixture to isomerize the pinene to terpinolene, subjecting the treated mixture to fractional distillation and recovering the terpinolene.

5. The method for the recovery of terpenes from a non-fractionable mixture containing a pinene which includes treating the mixture with a strong acid, whereby the pinene is isomerized to dipentene, subjecting the treated mixture to fractional distillation and recovering the dipentene.

6. The method for the recovery of terpenes from a non-fractionable mixture containing a pinene which includes heating the mixture with a strong acid, whereby the pinene is isomerized to dipentene, subjecting the treated mixture to fractional distillation and recovering the dipentene.

7. The method for the recovery of terpenes from a non-fractionable mixture containing a pinene which includes heating the mixture with sulfuric acid, whereby the pinene is isomerized to dipentene, subjecting the treated mixture to fractional distillation and recovering the dipentene.

8. The method for the recovery of terpenes from a non-fractionable mixture containing a pinene which includes heating the mixture with phosphoric acid, whereby the pinene is isomerized to dipentene, subjecting the treated mixture to fractional distillation and recovering the dipentene.

9. The method for the recovery of terpenes from a non-fractionable mixture containing a pinene which includes heating the mixture with formic acid, whereby the pinene is isomerized to dipentene, subjecting the treated mixture to fractional distillation and recovering the dipentene.

10. The method for the recovery of terpenes from a non-fractionable mixture containing a pinene which includes heating the mixture with phosphoric acid at a temperature of from about 70° C. to about 100° C., whereby the pinene is isomerized to dipentene, subjecting the treated mixture to fractional distillation and recovering the dipentene.

11. The method for the recovery of terpenes from a non-fractionable mixture of a pinene and paramenthane which includes treating the mixture to isomerize the pinene to a terpene having a boiling point different from that of pinene, subjecting the treated mixture to fractional distillation and recovering the said terpene.

12. The method for the recovery of terpenes from a non-fractionable mixture of a pinene and a petroleum hydrocarbon which includes treating the mixture to isomerize the pinene to a terpene having a boiling point different from that of pinene, subjecting the treated mixture to fractional distillation and recovering the said terpene.

13. The method for the recovery of terpenes from a non-fractionable mixture of a pinene and paramenthane which includes treating the mixture to isomerize the pinene to dipentene, subjecting the treated mixture to fractional distillation and recovering the dipentene.

14. The method for the recovery of terpenes from a non-fractionable mixture of a pinene and a petroleum hydrocarbon which includes treating the mixture to isomerize the pinene to dipentene, subjecting the treated mixture to fractional distillation and recovering the dipentene.

DONALD H. SHEFFIELD.